Dec. 9, 1930.  L. R. BUCKENDALE ET AL  1,784,268
MOTOR VEHICLE
Filed Dec. 19, 1927   2 Sheets-Sheet 1
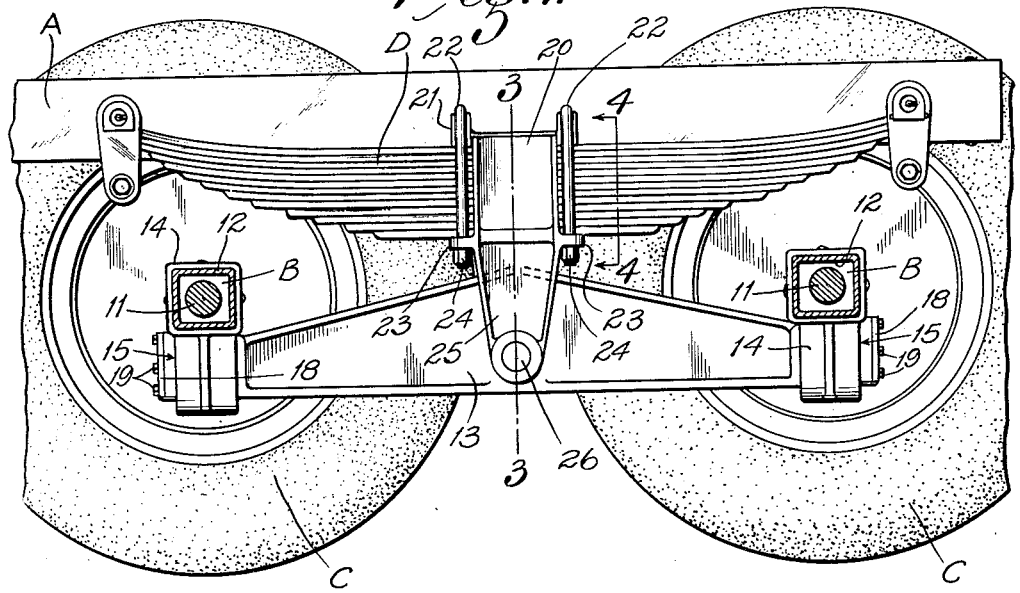
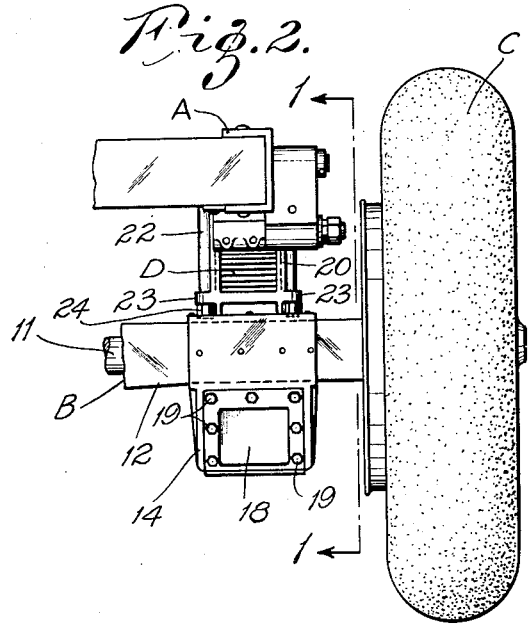
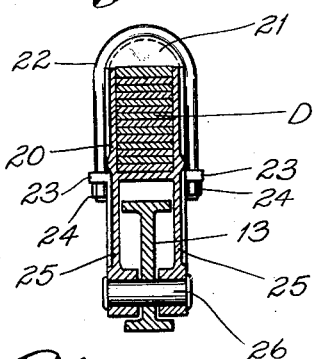
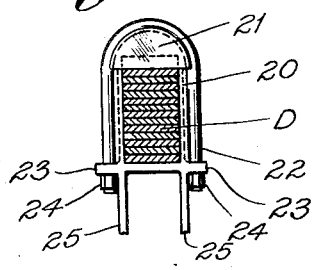

Dec. 9, 1930.   L. R. BUCKENDALE ET AL   1,784,268
MOTOR VEHICLE
Filed Dec. 19, 1927   2 Sheets-Sheet 2
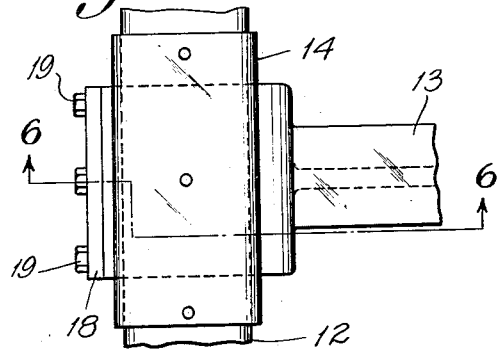
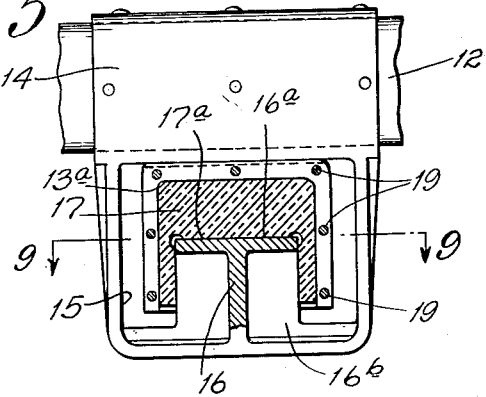
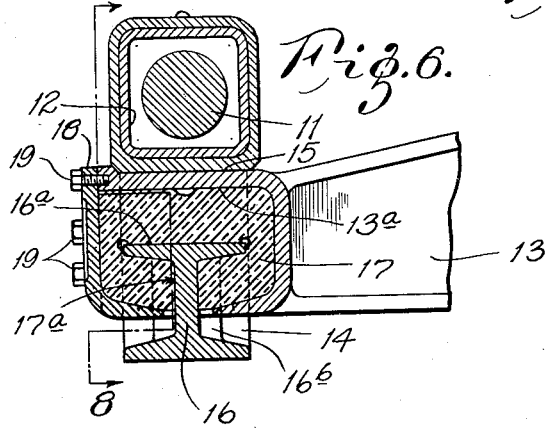
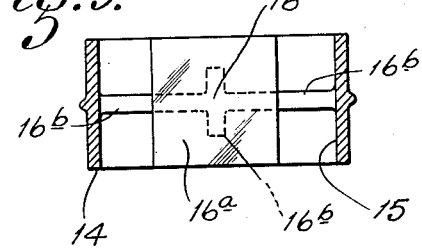
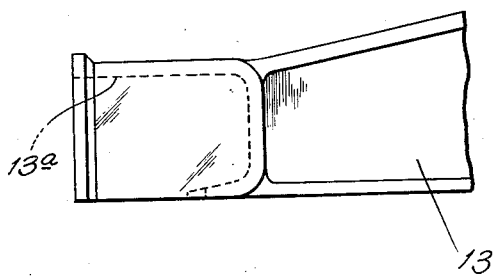
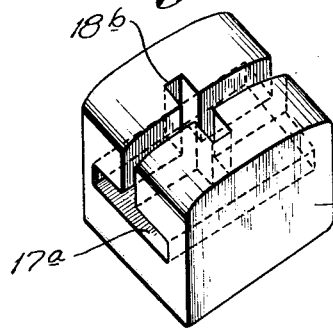
INVENTOR:
Lawrence R. Buckendale
and Clarence A. Peirce
HIS ATTORNEYS.

Patented Dec. 9, 1930

1,784,268

UNITED STATES PATENT OFFICE

LAURENCE R. BUCKENDALE, OF DETROIT, MICHIGAN, AND CLARENCE A. PEIRCE, OF CHICAGO, ILLINOIS

MOTOR VEHICLE

Application filed December 19, 1927. Serial No. 241,079.

This invention relates to motor vehicles of the kind having two rear driving axles enclosed in axle housings. It has for its principal objects to provide an improved mechanism that will resist the driving and braking torque exerted on the axle housings; that will absorb such torque stresses and cushion the road shock; that will maintain the axles in parallel alinement and in proper spaced relation; that will permit the wheels to accommodate themselves to rough roads and to track slightly when the vehicle is turned; and that will employ other advantages hereinafter appearing.

The invention consists principally in connecting the two rear driving axles to each other by means of torque bars and in providing cushion connections between the torque bars and said axle housings. It also consists in pivotally connecting the torque bars to the vehicle springs; and it also consists in the construction, combinations and arrangements of parts hereinafter described and claimed.

In the accompanying drawings, which form part of this specification and wherein like symbols refer to like parts wherever they occur, Fig. 1 is a vertical section through the two rear driving axles of a motor vehicle equipped with a torque mechanism embodying our invention, the section being taken between the one side frame member of the vehicle and the wheels adjacent thereto on the line 1—1 in Fig. 2;

Fig. 2 is a rear elevation of one of the rear corner portions of the vehicle;

Fig. 3 is a vertical cross-section through the spring clip and torque bars on the line 3—3 in Fig. 1;

Fig. 4 is a vertical cross-section through the spring on the line 4—4 in Fig. 1, looking in the direction of the spring clip;

Fig. 5 is a fragmentary plan view, showing the adjacent portions of an axle housing and a torque bar;

Fig. 6 is a vertical cross-section on the line 6—6 in Fig. 5;

Fig. 7 is a side elevation of the end portion of the torque bar;

Fig. 8 is a vertical cross-section on the line 8—8 in Fig. 6;

Fig. 9 is a horizontal cross-section through the torque bar supporting portion of the torque bar hanger, with the rubber cushioning block removed; and Fig. 10 is a perspective view of one of the rubber cushioning blocks with its grooved bottom side disposed uppermost.

Referring to the accompanying drawings, our invention is shown in connection with the running gear of a six wheel motor vehicle, of which is shown only the rear portion of one of the longitudinal side bars or frame members A, of the vehicle, the adjacent end portions of two rear driving axles B and their wheels C and a semi-elliptic body supporting leaf spring D which is located outside of said side rail and extends longitudinally thereof above the driving axles with its ends shackled to said side rail. Each of the rear driving axles comprises driving shaft sections 11 operatively connected to receive motion from the differential mechanism (not shown) and transmit motion to the traction wheels C, and an axle housing 12 for enclosing the differential mechanism and said shaft sections. The construction thus far described is well known and it is considered unnecessary to illustrate it in detail.

The two driving axles are spaced apart longitudinally of the vehicle and are held parallel to each other by a horizontal tie or torque bar 13, which extends from axle to axle beneath each side spring D. The ends of the torque bar 13 extend beneath the respective axle housings 12 and are suspended therefrom by means of hanger members 14 secured to said axle housings beneath the springs. Each of these hanger members comprises a tubular upper portion, which is sleeved on and riveted or otherwise rigidly secured to said housing, and a depending hanger portion having an opening 15 extending therethrough transversely of the axle and large enough to accommodate the adjacent end of the torque bar. The lower portion of the torque bar receiving opening 15 of the hanger 14 is provided with an upstanding pedestal 16 comprising a horizontal top flange 16a, which is narrower than the opening in the bracket and is connected to the bottom flange of the hanger portion of said bracket by means of intersecting vertical cross-webs 16b.

Attached to the upstanding pedestal 16 located in the torque bar receiving opening 15 of each hanger 14 is a block 17 of rubber or other suitable nonmetallic yielding substance. As shown in the drawings the rubber block 17 is provided with a T-shaped channel 17a adapted to fit the top flange 16a and one of the cross-webs 16b of the pedestal 16, and is also provided at its center with a transverse recess 18b which intersects the stem of the T-shaped channel 17a and is adapted to embrace the other cross-web of said pedestal. The yielding block 17 may be readily attached to the pedestal of the hanger by spreading apart the walls of the stem of its T-shaped channel far enough to permit the top flange and cross webs of the pedestal to seat with the grooves or recesses provided therefor in said block. By this arrangement the rubber block closely embraces the top flange and the cross-webs of the pedestal and is thus held against displacement with reference thereto.

The torque bar 13 is provided at each end with an outwardly opening recess 13a of a size and shape adapted to fit or accommodate one of the rubber cushioning blocks 17 seated on the pedestal 16 of one of the hangers 14, the bottom wall of said recess terminating short of said end of said bar so as to clear the inner edges of the vertical cross-webs of the pedestal. Each rubber block is confined under compression within the recess provided therefor in the end of the torque bar by means of a cover plate 18 which closes the outer end of said recess and is removably secured to the end of the torque bar preferably by means of cap screws 19.

The leaves of the side spring D are clamped together intermediate its ends by means of a spring clamp 20 having a channel at its top adapted to receive the spring, a clamping plate 21 resting on the top leaf of the spring between the side walls of said channel, and a pair of U-bolts 22 placed astraddle the channel portion of said spring clip with their curved upper ends resting in grooves provided therefor in said clamping plate and with their depending branches passing through holes in outstanding lugs 23 at the sides of the clip and threaded to receive nuts 24. By this arrangement the leaves of the spring D may be tightly clamped together between the bottom of the channel of the spring clamp 20 and the clamping plate 21 by tightening the nuts 24 at the lower ends of the U-shaped clamping bolts 22. As shown in the drawings, the spring clamp 20 is provided with laterally spaced depending bracket or hanger portions 25 which straddle the middle portion of the torque bar 13 and are pivotally secured thereto by means of a horizontal pivot pin 26 which passes through registering openings provided therefor in the hanger portions of the spring clamp and in the portion of the torque bar straddled thereby. By this arrangement the weight of the body of the vehicle is transmitted through the side spring and torque bar to the axle housings and thence to the wheels.

The hereinbefore described arrangement has numerous advantages. It normally maintains the axles in proper spaced relation and in parallel alinement to each other while affording limited relative movement between the torque bar and axles in every direction; it also resists the tendency of the axle housings to rotate due to driving, braking and traction strains thereon by transmitting these torque strains to the springs to be absorbed thereby; it also serves to absorb and cushion the torque strains transmitted to the torque bars from the axle housings; and it also serves to cushion the road shocks and to permit the wheels to accommodate themselves to rough roads and to track slightly when the vehicle is turned. Another advantage is that it secures cushion connections between the axle housings and the torque bar without the use of metal connections, which are objectionable by reason of the fact that they require lubrication and are liable to become loose and rattle.

Obviously, the hereinbefore described arrangement admits of considerable modification without departing from the invention, and we do not wish to be limited to the precise arrangement shown and described.

What we claim is:

1. A motor vehicle comprising two driving axles provided with housings, a rigid torque bar extending from housing to housing, upstanding pedestals on said housings, and nonmetallic cushioning members between the ends of said torque bar and said pedestals.

2. A motor vehicle comprising two driving axles provided with housings having hanger portions projecting therefrom provided with openings, torque members extending from housing to housing with their ends supported in the openings in said hanger portions, and nonmetallic cushioning members between said hanger portions and the ends of said torque members.

3. A motor vehicle comprising two driving axles provided with housings having hangers depending therefrom, rigid torque bars extending from housing to housing with their ends supported on said hangers, nonmetallic cushioning members removably secured to said hangers, said torque bars being provided with recesses adapted to receive said cushioning members, and means for retaining said cushioning members in said recesses.

4. A motor vehicle comprising two driving axles provided with housings having hangers depending therefrom, rigid torque bars extending from housing to housing with their ends resting on said hangers, nonmetallic cushioning members removably secured to said hangers, said torque bars being provided with recesses adapted to receive said cushioning members, and cover plates for closing said recesses and for retaining the cushioning members therein.

5. A motor vehicle comprising two driving axles provided with housings having hanger portions depending therefrom provided with openings, a side frame member extending longitudinally of the vehicle at each end of said housings, a leaf spring extending longitudinally of said frame member and secured thereto above said axles, a member extending from housing to housing with its ends supported in the openings in said hangers, means for pivotally connecting said member to said spring, and cushion connections in said openings between the ends of said torque member and said hangers.

6. A motor vehicle comprising two driving axles provided with housings, hangers secured to said housings, each of said hangers comprising a tubular portion sleeved on an axle housing and a depending hanger portion having an opening extending therethrough transversely of said axle, torque bars extending from axle to axle with their ends extending into the openings in said hangers, and cushion connections between said ends of said torque bars and the hangers on the respective axles.

7. A motor vehicle comprising two driving axles provided with housings, hangers secured to said housings, each of said hangers comprising a tubular portion sleeved on an axle housing, a depending hanger portion having an opening extending therethrough transversely of said axle and an upstanding pedestal in said opening, torque members extending from housing to housing with their ends secured to the pedestals of said hangers, and nonmetallic cushioning members between said pedestals and the ends of said torque bars.

8. A vehicle comprising two axles provided with hanger portions having openings extending therethrough transversely of said axles and upright pedestals in said openings, cushioning members mounted in said pedestals, a member extending from axle to axle with its ends extending into the openings in the hanger portions thereof, the ends of said last mentioned member being provided with recesses adapted to receive said cushioning members, and means for retaining said cushioning members in said recesses.

9. A vehicle comprising two axles provided with hanger portions having openings extending therethrough transversely of said axles and upright pedestals in said openings nonmetallic cushioning blocks mounted on said pedestals, members extending from axle to axle with their ends extending into the openings in the hanger portions thereof, the ends of said members being provided with recesses adapted to receive said nonmetallic cushioning blocks, and cover plates for closing said recesses and for retaining said nonmetallic cushioning blocks therein.

Signed at Detroit, Michigan, this 7th day of December, 1927.

LAURENCE R. BUCKENDALE.

Signed at Chicago, Illinois, this 12th day of December, 1927.

CLARENCE A. PEIRCE.